Jan. 27, 1959 W. E. BARNES 2,870,844
WELL SAMPLING DEVICE

Filed July 19, 1955 3 Sheets-Sheet 1

INVENTOR.
WILLIAM E. BARNES
BY
Robert O. Spindle
ATTORNEY

Jan. 27, 1959 W. E. BARNES 2,870,844
WELL SAMPLING DEVICE
Filed July 19, 1955 3 Sheets-Sheet 2
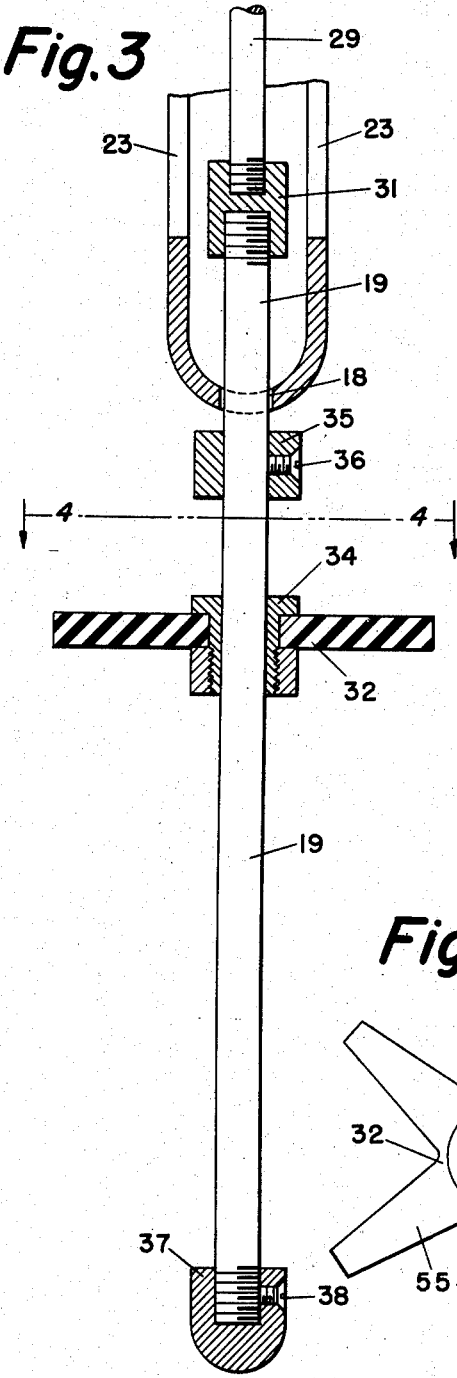
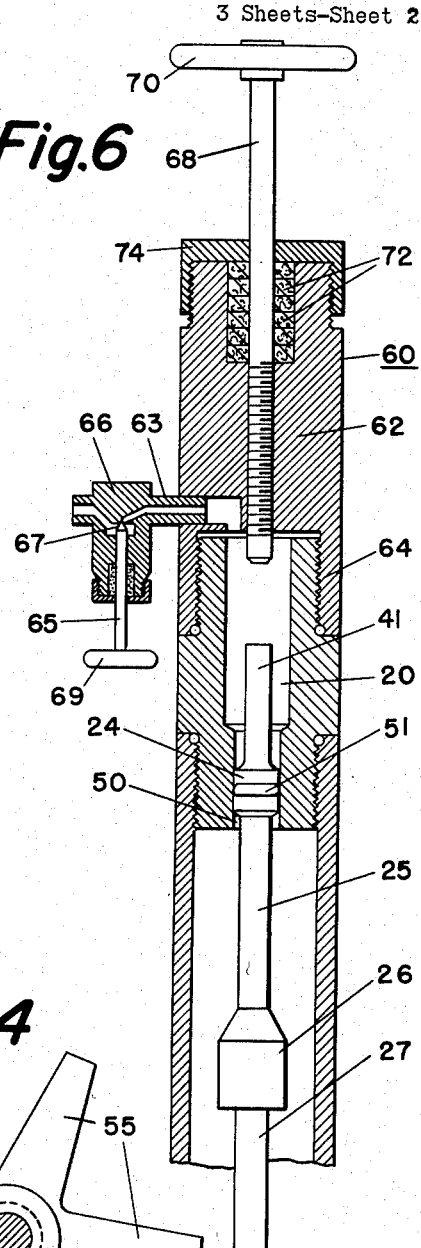
INVENTOR.
WILLIAM E. BARNES
BY
Robert O. Spindle
ATTORNEY Jan. 27, 1959  W. E. BARNES  2,870,844
WELL SAMPLING DEVICE
Filed July 19, 1955  3 Sheets-Sheet 3

INVENTOR.
WILLIAM E. BARNES
BY
Robert O. Spindle
ATTORNEY

United States Patent Office 2,870,844
Patented Jan. 27, 1959

2,870,844

WELL SAMPLING DEVICE

William E. Barnes, Beaumont, Tex., assignor to Sun Oil Company, Philadelphia, Pa., a corporation of New Jersey Application July 19, 1955, Serial No. 522,908

3 Claims. (Cl. 166—165)

This invention relates to improvements in well fluid sampling devices and particularly to modifications in such devices for cooperation with auxiliary sample testing mechanisms.

The form of sampler for which the improvement shown here is particularly useful is disclosed and claimed in my Patent No. 2,686,566, issued August 17, 1954. That sampler provides a valve arrangement constructed to retain a well fluid sample under the conditions of temperature and pressure of the locus from which it is taken. Once that sampler captures a sample it is necessary to use laboratory equipment to remove it and maintain the incorporated temperature-pressure conditions. Frequently, after transporting a sample to the laboratory, it is found that the sampler contains water or gas alone, and not the desired petroleum well fluid. It is an object of this invention to provide an improved sampler with which a test extracting means can be combined to determine the sample value at the well bore site.

It is a further object to provide an auxiliary means usable with sampler devices of this type which is operable therewith for test extraction purposes.

Still another object is to provide the testing means for cooperation with the sampler which requires a minimum of alteration of the basic device.

And yet another object is to provide a testing means which, as it is not incorporated in the sampler during the sampling operation, will not affect the operating characteristics of the device in the sample selection.

Further objects and advantages of the invention will be apparent by reference to the following specification and drawing, in which:

Figure 3 is a view showing details of elements positioned exteriorly of the lower portion of the device.

Figure 4 is a view taken on line 4—4 of Figure 3.

Figure 6 is an elevational sectional view of the test means and upper part of the sampler connected preliminary to testing.

Figure 1:
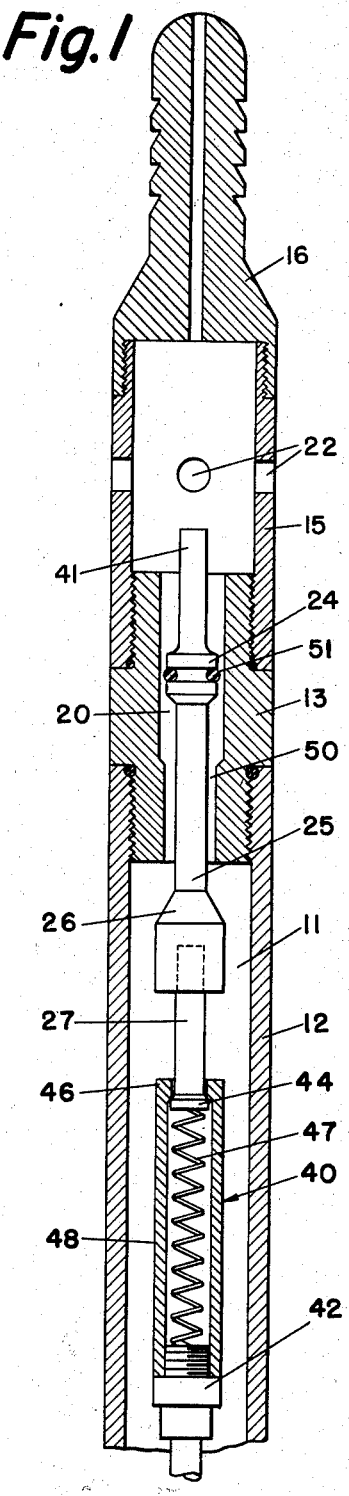
Figure 1 is a longitudinal section through the upper end portion of the device showing details thereof.

In general, the device disclosed and claimed in Patent No. 2,686,566, and with which my improvements have been combined, comprises an elongate housing having upper and lower valves. Each of these valves includes a valve seat and a cooperating valve plug. Between the valves an elongate chamber is positioned to receive the fluid sample. Below the lower valve, the elongate housing terminates in a fluid inlet section, and above the upper valve is a fluid outlet section. The valves provide axial passageways, which effect communication between the inlet-outlet sections, and permit continuous flow of fluid through the sample chamber when the valves are open. The plugs of the upper and lower valves are connected by a rod passing through the sample chamber. In this modification enabling cooperation with the testing sub-combination later described, resilient means is incorporated in the connecting rod whereby both valve plugs are operated together when the rod moves in one direction, yet permits the upper valve plug to be depressed independently of the lower valve when it is desired to test the captured sample. Thus the valves are simultaneously reciprocated to the closed position stopping the flow of fluid through the sample chamber to capture a sample, and are independently movable when extracting a test portion thereof. Resilient seal rings are provided on each of the valve plugs to provide an effective seal with the axial passageways of the valves. The passageways in which the valve plugs reciprocate are of substantial depth permitting valve plug movement without breaking the seal of the sample chamber once established. A valve actuating shaft extends through the inlet section of the elongate housing and is arranged to move the valve plugs to the closed position. On this shaft, exteriorly of the housing, a flexible actuator is mounted to frictionally contact the tubing wall and be flexed upwardly or downwardly in accordance with the movement of the device through the tubing. In response to this frictional contact with the tubing when the housing is moved upwardly of the tubing, the valves are moved to the closed position.

With this sampler, thus generally described, is combined the removal means for testing the sample enclosed therein. Briefly, this auxiliary device can be described as a cap designed to replace the line securing element attached to the upper end of the elongate body of the operating sampler. Once in place the body of the sampler is sealed against contamination of the sample by the atmosphere. Sealed, screw means engages the sampler valve arrangement and forces the upper valve to release the pressured sample in the body to press against this cap arrangement. A needle valve let into the body of the cap affords the means for removing test portions of the sample as desired. The sub-combination described here as auxiliary to the sampler, and the modification of the sampler necessary to use it, will be fully understood after reading the following detailed description with reference to the figures of the drawing.

Figure 2:
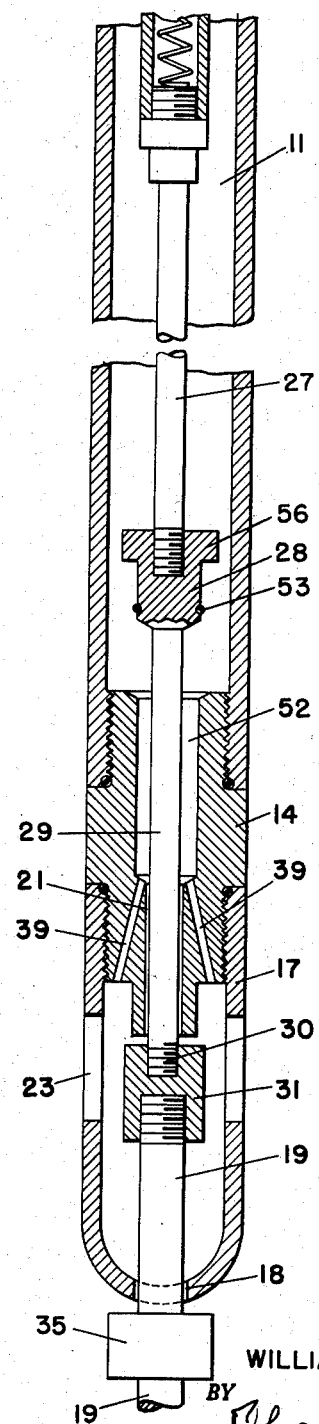
Figure 2 is a longitudinal sectional view in continuation of Figure 1 and of the lower end portion of the device showing details thereof.

In Figures 1 and 2, 11 indicates a sample chamber which is formed by a tubular member 12 having screw-threadedly secured at its upper end a coupling 13 and in its lower end another coupling 14. The coupling 13 is in turn screw-threaded to an upper cylinder 15 which has at its upper end a cap 16 arranged to receive a wire line for lowering the device into the well tubing. The coupling 14 receives a lower cylinder 17 having an aperture 18 at its lower end for the reception of an actuating shaft 19, the function of which will later be described. The couplings 13 and 14 are provided with axial passageways 20 and 21 respectively while the upper and lower cylinders 15 and 17 are apertured at 22 and 23 respectively for permitting fluid to flow through the device. For example when the device is lowered into a well any liquid encountered will enter cylinder 17, which is the inlet section of the device, pass through coupling 14, the sample chamber 11 and out through cylinder 15, which is the outlet section of the device. The couplings 13 and 14 are arranged to provide valve seats and to receive valve plugs which are in open position during passage of the device into well tubing and in closed position when the device is withdrawn in order to retain a sample of fluid within the sample chamber.

A valve plug 24 having a valve stem 25 extends through passageway 20 and terminates in a screw-threaded end portion 26 for the reception of the upper end of a connecting rod 27 positioned within the sample chamber 11 and which has its lower end secured to a valve plug 28. As part of the modification of the original sampler to meet the operating requirements of this device, resilient means such as collapsible link 40 is inserted in connecting rod 27 within sample chamber 11. The respective ends of connecting rod 27 are fashioned to be received by the collapsible link 40, one in fixed relation as at threaded connection 42, and the other provided with head 44 to fit behind reduced portion 46 of the collapsible link body 48 and abut spring 47. The valve plug 28 is positioned within the sample chamber and has a valve stem 29 which extends through the axial passageway 21 of the coupling 14 and terminates in a screw-threaded end portion 30, positioned within the inlet section 17. The valve plug 28 is screw-threaded to receive the lower end of the connecting rod 27 and the lower end 30 of its valve stem 29 is interconnected with the actuating shaft 19 through connector 31.

As shown in Figure 3, the actuating rod 19 extends through the aperture 18 in the inlet section 17 and is provided with an actuator 32 which preferably is of rubber or some suitable material which may be flexed when in frictional contact with the inner wall of the well tubing. The flexible actuator 32 is mounted in a stuffing nut 34 in order to permit the shaft 19 to move relative thereto. Directly below the lower end of the inlet section 17, shaft 19 is provided with an upper stop 35 fixed thereto by means of a set screw 36, and at the lower end, shaft 19 is provided with a lower stop 37 secured to the shaft by set screw 38.

Since the valve stem portion 29 of valve plug 28 is disposed in close fitting relation with the passageway 21, a plurality of additional openings 39 shown clearly in Figure 2 are provided for the passage of fluid from the inlet section 17 into the sample chamber 11.

The axial passageway 20 in coupling 13 terminates in a reduced portion 50 which forms a cylindrical valve seat for upper valve plug 24 and the valve plug is provided with an annular sealing ring 51 preferably formed of rubber or other flexible material. Valve plug 24, above the sealing ring 51, is reduced in diameter as at portion 41 as a further modification of the original mechanism required for this application. The reason for this change will be evident later in the specification. The axial passageway in coupling 14 terminates at its upper end in an enlarged portion 52 providing a cylindrical valve seat for the lower valve plug 28 which is also provided with an annular flexible sealing ring indicated at 53. The aperture 18 and axial passageway 21 function as guides to maintain the valve plugs 24 and 28 aligned axially of the housing.

In Figure 4 is shown a plan view of the valve rod actuator 32 which as indicated is preferably provided with a plurality of lateral fingers 55. The actuator is constructed of material which is capable of being flexed so that as the device is lowered into the well tubing, it will be flexed downwardly when in frictional contact with the tubing, and the valve shaft 19 will move downwardly through the stuffing nut 34 until the upper stop 35 is reached, and when the device is pulled outwardly of the tubing, the actuator 32 will be flexed upwardly, and the actuating shaft 19 will move through the stuffing nut 34 until the lower stop 37 is reached.

Figure 5:
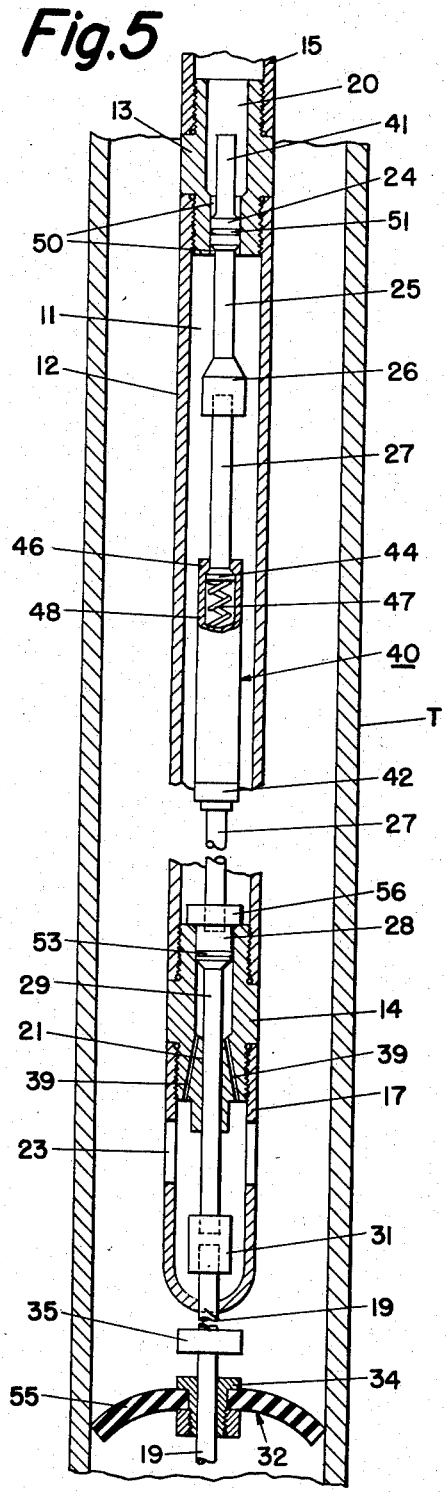
Figure 5 is an elevational view in reduced scale, partly broken away, of the sampling device with elements in sample retaining position.

In proper conclusion to Figures 1 to 4, inclusive, Figure 5 is added prior to discussing the test cap which cooperates with this device. The relative changes in position between the several moving elements and the housing are illustrated here. As will be fully understood later, after reading the operating description, these elements move to capture and retain a sample of the bore hole fluids. With this accomplished, the use of the test cap in combination with the sampler, reasons for having a test cap and its functions will be fully appreciated.

Figure 7:
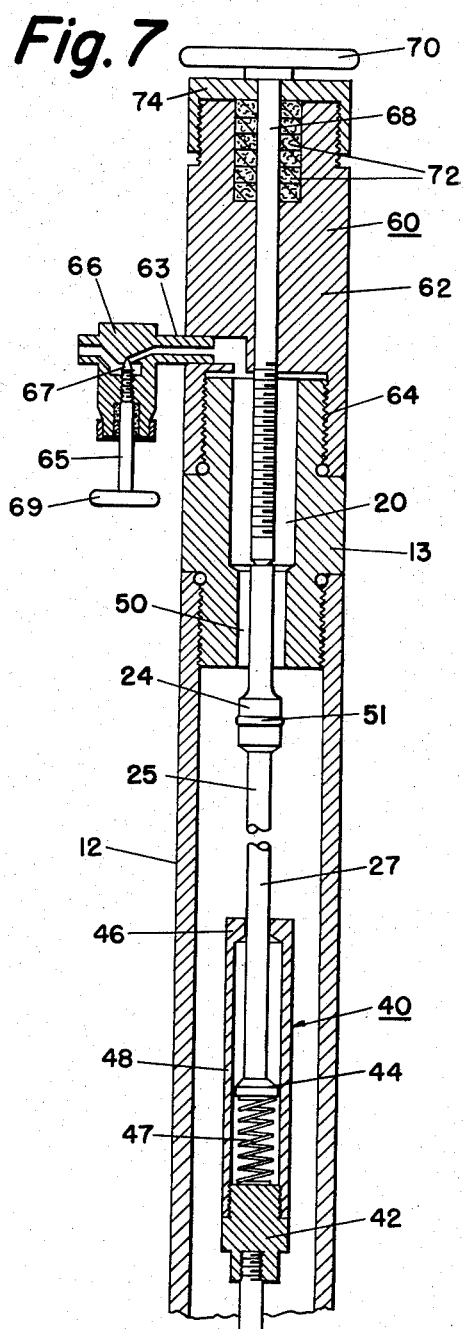
Figure 7 is an elevational sectional view of the test means and upper part of the sampler with elements in cooperating engagement.

Referring now to Figures 6 and 7, two views of the test cap for removing a portion of the sample held in the sampler body are shown in combination with the above described sampler. The sample test means, or test cap, is generally denoted by the numeral 60 and is adapted to threadedly engage coupling 13 in tight union. The annular seal rings embracing the male threaded portion of coupling 13 shown unnumbered in Figure 1 are retained and assist in forming a seal with test cap 60 when it is screwed home. This sample test means 60 includes, as shown in these figures, a body portion 62 tapped as at 64 to engage the upper male thread of coupling 13, a convenient valve element 66 preferably of the needle type for exact and controlled venting, and an operating element or screw stem 68 complete with a hand wheel 70.

Additional elements and more complete details of those named will be evident by referring to the different operating positions illustrated in both figures. The screw stem 68 with accompanying hand wheel 70 is conventionally position to engage the upper diametrically reduced portion 41 of valve plug 24. Packing 72 pressed into tight sealing relation with stem 68 by threaded screw-cover 74 prevents escape of the sample. Valve 66, in this view, is sectioned to show operating engagement with passageway 20 extended ready to receive and control the selected test portion of the sample held in the sampler. Needle valve 65 controls the outlet 63 by engaging the ground seat 67, releasable by rotating the operating wheel 69.

For a better understanding of the cooperation of the sampler and the test venting cap, the capture of a sample by the sampler will be described. The test means will then be connected and the combination operated. From the description of the device so far, it will be noted that the valve plugs 24 and 28 are in the position shown in Figures 1 and 2, which would be the condition existing when the device is lowered into the well tubing, and the valve actuator 32 is flexed with fingers 55 turned upwardly, which causes the valve actuating shaft 19 to move upwardly relative to the actuator 32 until the upper stop 35 engages the housing at which time the couplings 13 and 14 and elements connected therewith will move downwardly and the valve plugs 24 and 28 will remain unseated. During the downward movement of the device into the well, any fluid contacted will pass into the inlet section 17, passageways 39 in coupling 14, the sample chamber 11, passageway 20 in coupling 13, and exit through the apertures 22 in the outlet section 15. Thus the sample chamber is continuously purged during downward travel and, upon reaching the depth from which a sample is desired, will contain fluids representative of the well fluids at that depth.

Upon upward movement of the device, the flexible actuator 32 will flex the fingers 55 downwardly through the frictional contact of its fingers with the tubing T as shown in Figure 5, and the shaft 19 will move upwardly through stuffing nut 34 of the actuator until stop 37 is reached. When stop 37 engages the flexible actuator now held by the tube, shaft 19 will be anchored and the housing and couplings 13 and 14 will move upwardly relative to the rod and shaft until the valve plugs 24 and 28 enter the cylindrical valve seats 50 and 52 respectively to seal the sample chamber and maintain liquid therewithin. At this time the sample chamber 11 will contain a true sample of oil from the reservoir which has been encountered. The position assumed by these elements at this time is shown in Figure 5.

The lower valve plug 28 is of greater cross-sectional area than the upper valve plug and, for example, may be provided with a shoulder 56 so that as long as the pressure within the sample chamber is greater than the external pressure on the device, the sample chamber will be maintained closed, and completely seal the sample within the chamber. The closed position of plug 28 is shown in Figure 5 as noted above.

It will be understood, of course, that the fingers 55 of the actuator 32 will extend laterally a sufficient distance and be of sufficient rigidity to make certain that it will be frictionally held by the tubing wall in order that it will contact the stops 35 and 37 when the shaft 19 is moved with respect thereto. The particular arrangement of actuating shaft and actuator shown in Figure 3 is provided in order that the actuator 32 may be knocked loose in case it becomes hung up in the tubing by raising the device a distance insufficient to cause the valves to close and then dropping it against the actuator. The device is operated in the manner of a jar, that is, by raising the device to its upper limit of motion until the lower stop 37 contacts the actuator 32 and dropping it until the upper stop 35 contacts the actuator 32 a series of impacts are produced which may be repeated until the actuator becomes movable with respect to the tubing.

The cylindrical valve seats 50 and 52 are of particular importance in the present invention since with this arrangement the valve plugs 24 and 28 may move within the cylindrical seats during removal of the device from the tubing and still maintain an effective seal. This provision is necessary since it is apparent that the connecting rod 27 will vary in length over a small range due to the great temperature difference existing between the surface and the bottom of the well tubing. Also, the actuating shaft will elongate slightly as the device is drawn from the well tubing due to its being subjected to an increasing tensile force which is required to maintain the upper valve in the seated position. The valve sealing rings 51 and 53 respectively, when the valve plugs are in seated position, will wipe the surfaces of the cylindrical seats free of any solid particles such as sand, rust or the like and thus provide a clean surface on which to establish an effective seal. In actual construction of the device, the valve plugs 24 and 28 are so arranged relative to the valve seats 50 and 52 that the seal rings, when the valves are in closed position, will be positioned about midway within the valve seats in order to allow for the contraction and expansion of the connecting rod 27 and still maintain a proper seal.

The resilient means shown as collapsible link 40 in these figures is positioned in Figure 5 to show the sample taking position. This will be contrasted, later, with its position when cooperating with test cap 60 in releasing a test portion of the captured sample. As flexible actuator 32 is frictionally engaging tubing T, shaft 19, connecting rod 27 and all elements of the upper and lower valves are comparatively static relative to the sampler housing. As couplings 13 and 14 move upwardly to seat the valve plugs 24 and 28 respectively, the ends of connecting rod 27, separated by collapsible link 40, are urged apart. Head 44 of collapsible link 40 is retained by reduced portion 46 urged into engagement by spring 47. The valve plugs move into their respective seats sealing sample chamber 11 with the fluid sample therein.

After the sampler of Figures 1, 2 and 3 is pulled from the tubing with the sample in the sample chamber 11, the upper spud or wire line engaging cap 16 and upper cylinder 15 are removed. As indicated above, the test cap 60 is screwed into place on coupling 13 moving into sealing engagement with the seal rings on the upper shoulders of the coupling, bringing stem 68 into alignment with the upper extension 41 of valve plug 24. The elements are now in the relative positions illustrated in Figure 6 and ready for the venting operation of the test cap 60.

Valve plug 24 and the lower end of stem 68 are brought into engagement. Needle valve 66 is closing valve passage 63 and body 62 of cap 60 forms a sealing element over passageway 20 on the upper end of the sampler. By properly rotating hand wheel 70, threaded stem 68 is advanced and urges valve plug 24 downwardly, forcing the ring seal 51 on valve plug 24 through passage 50 to vent the seal chamber 11 through passageway 20 as shown in Figure 7. The lower portion of sample chamber 11 is sealed off by annular seal ring 53 on valve plug 28, being firmly seated in passageway 52 of coupling 14. Consequently the downward movement of valve plug 24 and valve stem 25 necessary to push ring seal 51 through the cylindrical valve seat 50 is absorbed in the resilient member 47 housed in the collapsible link body 48 between the separate sections of connecting rod 27.

When the annular seal 53 is forced through passageway 20 to vent chamber 11 it is destroyed and must be replaced before another sample is taken. Once the seal is in that lowermost position, having passed through the valve seat 50, the sample, under pressure, expands to fill passageway 20 and the needle valve 66 passageways. A test portion is then readily obtained by manipulation of valve 66.

Should the sample be found satisfactory the complete sampler with affixed test cap as illustrated in Figure 6 is sent to the laboratory for removal of the sample into test equipment. If, on the other hand, the sample is not satisfactory, the sampler is vented, the test cap removed, and the device made ready for another sampling operation.

I claim:

1. A device adapted to be lowered into and removed from well tubing for obtaining a sample from a fluid reservoir within a well comprising an elongate housing having spaced upper and lower valve bodies providing a fluid sample chamber therebetween, said bodies having axial passageways extending therethrough communicating with said sample chamber, the passageway in the upper of said bodies providing an elongated valve seat and a lower valve seat provided in the passageway of said lower body; an upper valve plug and a lower valve plug positioned for operating engagement with the respective seats, said upper valve plug being of a diameter less than the diameter of the elongated valve seat and having a seal ring thereon for sealing contact with said seat, said lower valve plug adapted to sealably engage said lower valve seat; a rod extending through said passages and comprising two sections, a section connected to each valve plug, means including a resilient member connecting said sections together between said valve plugs permitting movement of the sections and their plugs relative to each other, said resilient member normally urging said sections to an extended position, means holding the sections against dissociation in said extended position; a shaft depending from said lower valve plug, and an actuator on said shaft positioned exteriorly of said housing frictionally engaging the tubing wall.

2. A device adapted to be lowered into and removed from well tubing for obtaining a sample from a fluid reservoir within a well comprising an elongate housing having spaced upper and lower valve bodies providing a fluid sample chamber therebetween, said bodies having axial passageways extending therethrough communicating with said sample chamber, the passageway in the upper of said bodies providing an elongated valve seat and a lower valve seat cooperating with the passageway of said lower body; an upper valve plug and a lower valve plug positioned for operating engagement with the respective seats, said upper valve plug being of a diameter less than the diameter of the elongated valve seat and having a seal ring thereon for sealing contact with said seat, said lower valve plug adapted to sealably engage said lower valve seat; a rod extending through said passages and separated into sections respectively connected to each valve plug, a compressed spring between the sections of said rod urging them apart, a tubular member threadedly connected to one of said sections positioned to support the spring and extending over an enlarged end portion of the second rod section and slidable on said second rod section, the portion of the tubular member extending over the enlarged portion having an inner diameter less than the diameter of said enlarged portion, a shaft depending from said lower valve plug, and an actuator on said shaft positioned exteriorly of said housing frictionally engaging the tubing wall.

3. A device adapted to be lowered into and removed from well tubing for obtaining a sample from a fluid reservoir within a well comprising an elongate housing having spaced upper and lower valve bodies providing a fluid sample chamber therebetween, said bodies having axial passageways extending therethrough communicating with said sample chamber, the passageway in the upper of said bodies providing an elongated valve seat and a lower valve seat cooperating with the passageway of said lower body; an upper valve plug and a lower valve plug positioned for operating engagement with the respective seats, said upper valve plug being of a diameter less than the diameter of the elongated valve seat and having a seal ring thereon for sealing contact with said seat, said lower valve plug adapted to sealably engage said lower valve seat; a rod extending through said passages and separated into sections respectively connected to each valve plug, a compressed spring between the sections of said rod urging them apart, a tubular member threadedly connected to one of said sections positioned to support the spring and extending over an enlarged end portion of the second rod section and slidable on said second rod section, the portion of the tubular member extending over the enlarged portion having an inner diameter less than the diameter of said enlarged portion; a shaft depending from said lower valve plug, and a plurality of flexible fingers laterally extending radially from said shaft into frictional engagement with the tubing wall.

References Cited in the file of this patent

UNITED STATES PATENTS

| | | |
|---|---|---|
| 2,342,367 | Pryor | Feb. 22, 1944 |
| 2,625,226 | Wofford | Jan. 13, 1953 |
| 2,661,802 | Johnston | Dec. 8, 1953 |
| 2,686,566 | Barnes | Aug. 17, 1954 |